US005436762A

United States Patent [19]

Duneau

[11] Patent Number: 5,436,762

[45] Date of Patent: Jul. 25, 1995

[54] GLASS FOR AN OPTICAL SIGNALLING DEVICE, THE GLASS BEING FITTED WITH NON-CATADIOPTRIC ELEMENTS

[75] Inventor: Andreé Duneau, Evreux, France

[73] Assignee: Valeo Vision, Bobigny, France

[21] Appl. No.: 992,067

[22] Filed: Dec. 17, 1992

[30] Foreign Application Priority Data

Dec. 20, 1991 [FR] France ................................ 91 15916

[51] Int. Cl.⁶ ................................................ G02B 5/126

[52] U.S. Cl. .................................... 359/535; 359/529; 359/530; 359/542; 362/333; 362/308

[58] Field of Search ................................ 359/528–535, 359/542; 362/333–340, 240, 244, 246, 307–311

[56] References Cited

U.S. PATENT DOCUMENTS

D. 221,026 6/1971 Heenan et al. ...................... 359/528
1,878,909 9/1932 Stimson .............................. 359/528
2,351,080 6/1944 Swarouski .......................... 359/529

FOREIGN PATENT DOCUMENTS 956566 1/1957 France ................................ 359/528
2844822 4/1980 France ................................ 362/339
443759 3/1936 United Kingdom ................ 359/529
2041189 9/1980 United Kingdom ................ 362/240

*Primary Examiner*—Georgia Y. Epps
*Assistant Examiner*—Thomas Robbins

[57] ABSTRACT

The invention relates to a glass for at least one signalling lamp, in particular for a motor vehicle. The glass includes a plurality of non-catadioptric elements that have the appearance of catadioptric needles but without performing the same function. At least a portion of the non-catadioptric elements have conical ends on the inside face of the glass. This makes it much easier to make a mold for mass-producing such a glass.

13 Claims, 2 Drawing Sheets

FIG_1
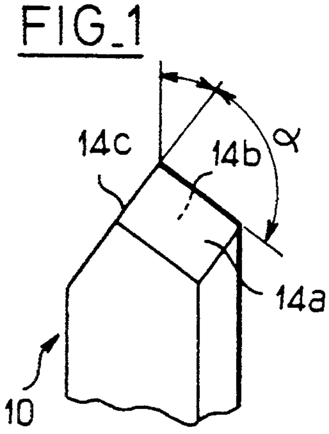
FIG_2
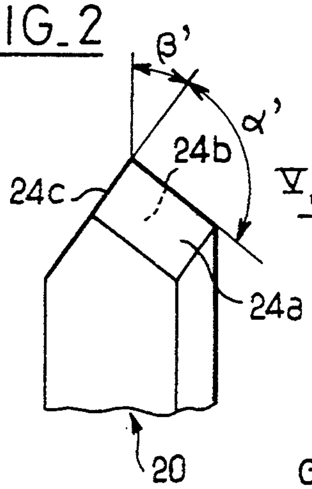
FIG_4
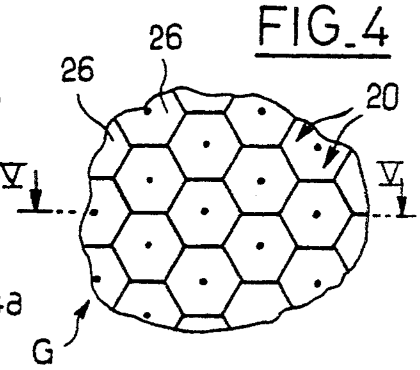
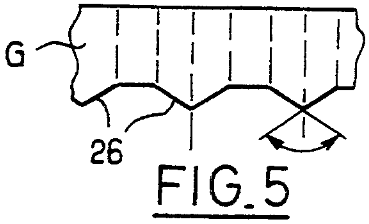
FIG_5
FIG_3
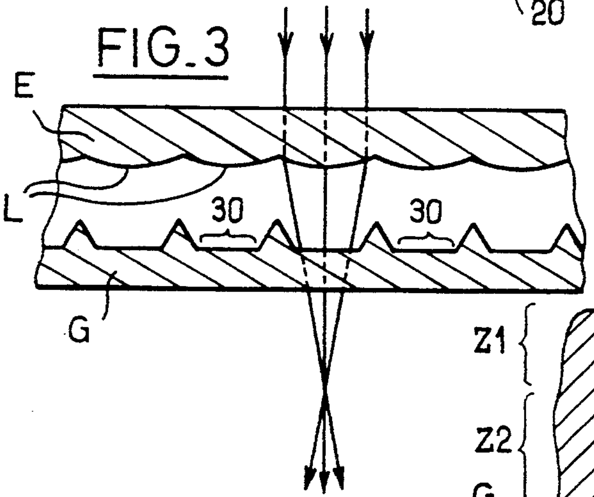
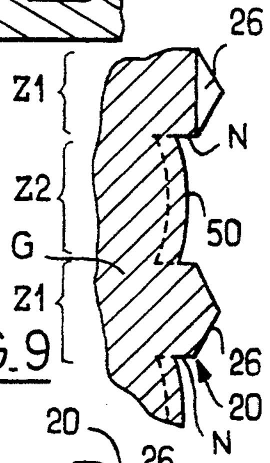
FIG_9
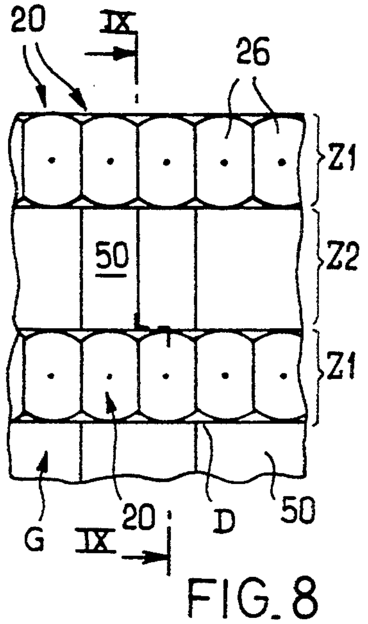
FIG_8
FIG_6
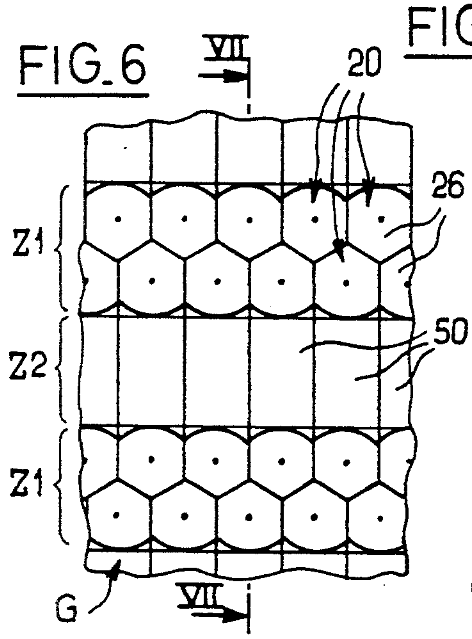
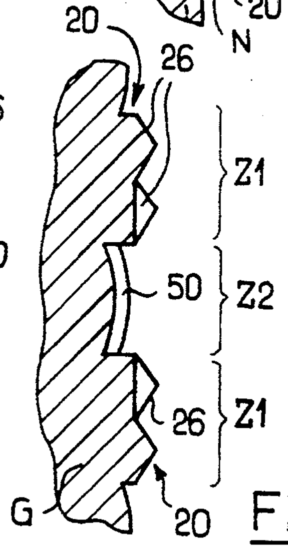
FIG_7

GLASS FOR AN OPTICAL SIGNALLING DEVICE, THE GLASS BEING FITTED WITH NON-CATADIOPTRIC ELEMENTS

The present invention relates in general to signalling lamps, in particular for motor vehicles, having a glass (or globe or cover) fitted with non-catadioptric elements, and possibly also with catadioptric elements.

Throughout the following description the term "non-catadioptric element" is used to designate an optical element which is similar in aspect to a genuine catadioptric element, but without possessing the retro-reflection function.

BACKGROUND OF THE INVENTION

With reference initially to FIG. 1, a conventional catadioptric element or "needle" 10 as formed, for example in the glass of a signalling lamp, is constituted essentially by a plane face for light inlet and outlet and situated on the outside of the glass, plus three plane surfaces **14*a*–14*c*** each occupying one of the faces of a comer comprising three right angles and situated on the inside of the glass for the purpose of providing retro-reflection by total internal reflection on each of the faces, for incident light that arrives along a direction close to the longitudinal axis of the element.

To ensure that such retro-reflection takes place adequately, the angle a defined by the faces of the corner or "trihedron" when taken in pairs is equal to 90°, and these faces are tangential to a cone having a half-angle at the apex $\beta$ that is equal to 35°15′.

A well known pseudo-catadioptric element 20 is shown in FIG. 2. The faces **24*a*–24*c*** of its trihedron are disposed relative to each other at an angle $\alpha'$ which is not equal to 90°, e.g. being about 92°, such that the half-angle at the apex $\beta'$ is now equal to 36°25′, for example, which means that the retro-reflection function is no longer provided even though the element retains an appearance entirely similar to that of a genuine catadioptric element so long as the lamp is out.

Another known solution for making a pseudo-catadioptric element consists in retaining the shape of the catadioptric element of FIG. 1, and frosting its faces **14*a*–14*c*** to prevent total reflection taking place thereon.

Both of those known solutions suffer from a first drawback whereby non-catadioptric elements are at least as time consuming and expensive to manufacture as catadioptric elements, even though they have no optical function to perform.

Furthermore, the above-described non-catadioptric elements suffer from the drawback of not passing light emitted from inside the lamp, so that such lamp cannot contribute to the signalling beam that is to be formed.

A known solution to this problem of loss of light is shown in FIG. 3. It consists in providing an intermediate screen E on the inside of the glass G of the lamp, which screen comprises lenses L or the like for concentrating the majority of the light from the source or from a reflector towards zones 30 of the glass that are not subjected to non-catadioptric treatment, and which are thus suitable for passing the light.

That known solution still suffers from the drawback of the lamp costing extra, and the lamp is difficult to bring into compliance with photometric regulations.

A first object of the present invention is to propose a glass that includes non-catadioptric elements that are extremely simple and cheap to make.

SUMMARY OF THE INVENTION

To this end, the present invention provides a glass for at least one signalling lamp, in particular for a motor vehicle, wherein the glass comprises in at least one zone a plurality of non-catadioptric elements each having a conical end on the inside face of the glass.

When the angle at the apex of at least one group of non-catadioptric elements lies in the range about 110° to about 165°, and preferably in the range about 130° to about 150°, said elements pass light that is incident on said inside face of the glass.

In contrast, if the angle at the apex of at least one group of the non-catadioptric elements is less than about 110°, then the elements obscure, at least in part, the light which is incident on said inside face of the glass.

In order to adjust the diffusion of the light passing through the light-passing non-catadioptric elements, it is possible to vary the orientations of the axes of the conical ends of the various non-catadioptric elements.

Preferably, at least one group of non-catadioptric elements is disposed in an elongate strip including one or more rows of said elements. Even more preferably, the glass comprises a plurality of parallel elongate non-catadioptric strips each including one or more rows of non-catadioptric elements alternating with a plurality of elongate strips for processing a light beam.

Under such circumstances, it is advantageous for each of said elongate strips for processing a light beam to include a plurality of light diffusion elements, with said elements preferably being identical in pitch to the non-catadioptric elements of said strips, or being at a pitch which is an integer multiple thereof.

In addition, each conical end of a catadioptric element may be provided on a rib extending from the inside of the glass over at least a portion of the width of each non-catadioptric strip.

In particular, for a glass of an optical block incorporating various different signalling functions, said glass may include in side-by-side disposition at least a first region having a plurality of non-catadioptric strips alternating with a plurality of elongate light beam processing strips, and a second region having a plurality of catadioptric strips each including one or more rows of catadioptric elements and situated in line with said non-catadioptric strips, alternating with a plurality of elongate strips for processing a light beam to be emitted.

The invention also provides motor vehicle signalling apparatus incorporating at least one signalling function and characterized in that it includes a glass as defined above.

BRIEF DESCRIPTION OF THE DRAWINGS

Preferred embodiments of the invention are described by way of example with reference to the accompanying drawings, in which:

FIG. 1 is a diagrammatic elevation view of a conventional catadioptric element;

FIG. 2 is a diagrammatic elevation view of a conventional non-catadioptric element;

FIG. 3 is a diagrammatic section through a glass and an intermediate screen of the prior art;

FIG. 4 is a front view of a set of non-catadioptric elements of the present invention;

FIG. 5 is a section view on line V—V of FIG. 4;

FIG. 6 is a fragmentary front view of a first embodiment of a glass fitted with non-catadioptric zones of the invention;

FIG. 7 is a section view on line VII—VII of FIG. 6;

FIG. 8 is a fragmentary front view of a second embodiment of a glass fitted with non-catadioptric zones of the invention;

FIG. 9 is a section view on line IX—IX of FIG. 8.

DETAILED DESCRIPTION

Figure 10:
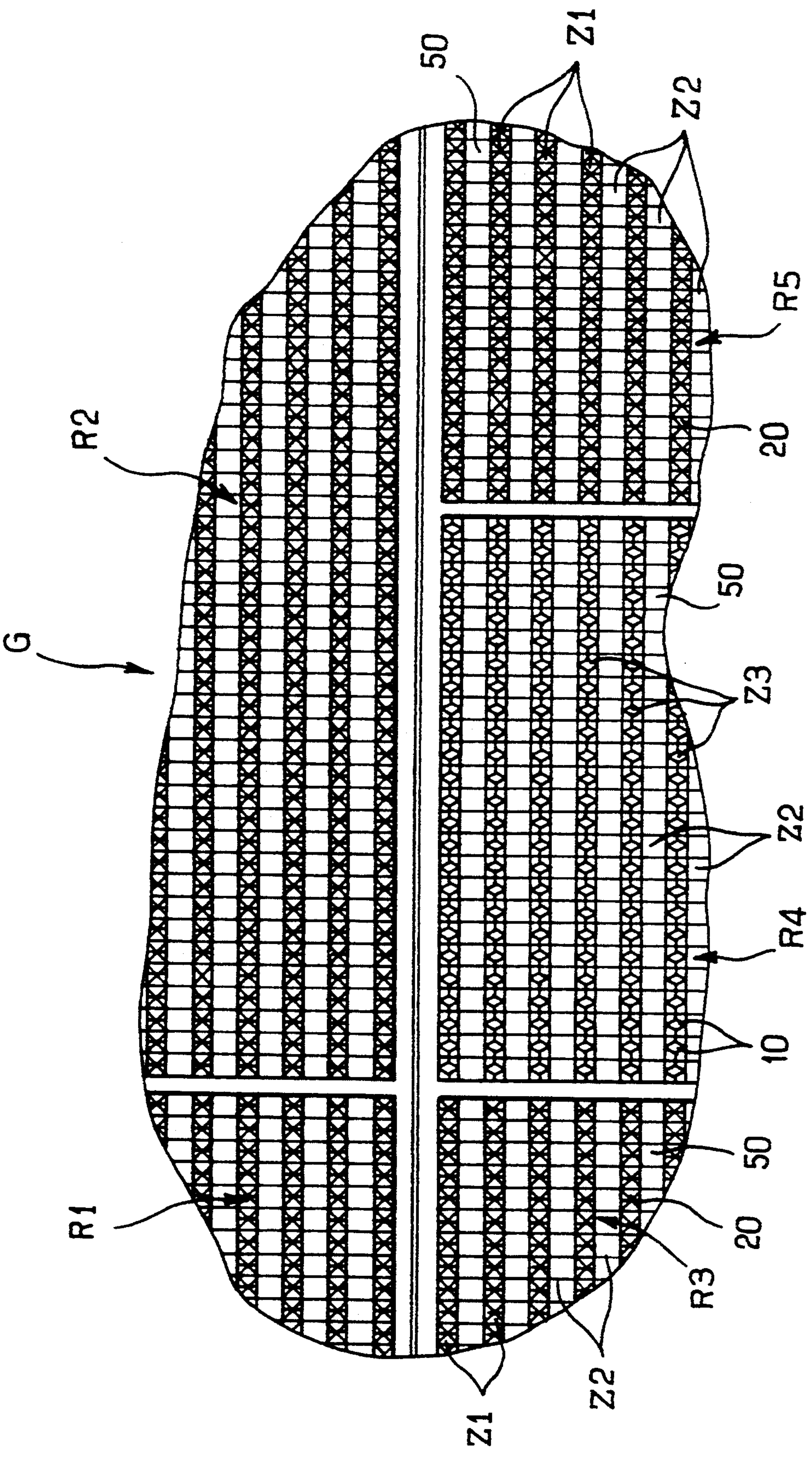
FIG. 10 is a fragmentary front view of a glass fitted with catadioptric zones in some zones and with non-catadioptric zones in other zones.

As a preliminary point, it will be observed that elements or portions that are identical or similar from one figure to another are designated therein by the same reference symbols.

With reference to FIGS. 4 and 5, a non-catadioptric zone of a glass G for a signalling lamp comprises a set of hexagonal-outline non-catadioptric elements 20 (in practice, said outlines are not boundaries between separate elements since the glass is made as a single piece) and the geometrical disposition thereof is a honeycomb disposition.

According to an essential aspect of the invention, the end face of each element on the inside of the glass is defined by a cone, designated by reference numeral 26. In the basic embodiment, the axis of the cone extends in the longitudinal direction of the element 20, which is advantageously parallel to the longitudinal direction of the vehicle.

Unexpectedly, it has been observed that although the shape of such a cone is quite different from that of a trihedron, it nevertheless serves, while the lamp is out, to give it an appearance that is quite similar to that of a genuine catadioptric element.

In addition, a non-catadioptric element of the invention is extremely easy and cheap to make since it suffices to form blind holes in the mold that is to be used for making the glass, said holes being made in the appropriate places by means of a drill bit that is terminated by a conical tip.

Another advantage of the invention lies in that a non-catadioptric element defined in this way is capable of passing light if an appropriate angle at the apex is chosen for the cone. More precisely, light will be passed satisfactorily for an angle at the apex lying in the range about 110° to about 165°, and preferably lying in the range about 130° to about 150°.

In addition, according to an advantageous aspect of the invention, the orientation of the axis of each cone in the non-catadioptric element can be modified so as to obtain horizontal and/or vertical distribution within the light beam of the light coming from the source, with this being done by the variation induced by the orientation of the refracted rays.

Naturally, in some circumstances, it is possible to use non-catadioptric elements of the invention which pass little or no light. Under such circumstances, the angles at the apex of the cones employed should lie in the range about 70° to about 110°. The light is almost completely obscured for angles at the apex that are less than or equal to about 78°.

More generally, an appropriate choice of the angle at the apex for the cones of the non-catadioptric elements, or else the use within a single glass of non-catadioptric elements having different values for their angles at the apex make it possible, where appropriate, to work on the photometry of a beam formed therethrough by acting on the rays that are incident on the non-catadioptric regions.

FIGS. 6 and 7 show a portion of a closure glass organized in relatively narrow strips comprising alternating non-catadioptric elements (zones Z1) and elements for diffusing the light emitted by the source, or in some cases having no optical role at all, e.g. having parallel faces (zones Z2).

In the present example, each strip Z1 comprises two horizontal rows of non-catadioptric elements 20 in a staggered configuration. The strips Z2 include toroidal elements 50, i.e. cylindrical stripes of curved vertical profile enabling the light emitted by the source to be diffused horizontally and vertically.

In addition, it may be observed in FIG. 6 that the strips Z1 and Z2 are approximately of the same length, and that the width of each diffusion torus 50 is equal to the width of an individual non-catadioptric element. It may also be observed in FIG. 7 that the angle at the apex of the cones is about 120°, i.e. they allow a very large portion of the light they receive from the source to pass, while simultaneously dispersing it.

The outside face of the glass G is smooth in order to satisfy regulations.

It may be observed that the diffusion elements 50 can take any appropriate shape such as being cylindrical, toroidal, spherical, prismatic, etc.

FIGS. 8 and 9 show another concrete embodiment for the invention. Here again there are zones Z1 of non-catadioptric elements and zones Z2 for diffusing light. Each strip-shaped zone Z1 comprises a single row of non-catadioptric elements 20 whose individual outlines are genuinely rectangular (but not formed physically). The elements 50 are again constituted by toruses, and this time the width of each torus is twice the width of the individual non-catadioptric elements. Finally, it may be observed that the width of the strips Z1 is slightly less than of the strips Z2.

In general, it is preferable for the pitch of the diffusion elements 50 in the length direction of the alternate strips should be identical to the pitch of the non-catadioptric elements, or to an integer multiple thereof.

FIG. 10 shows a portion of a glass G for a block of rear signalling lamps on a vehicle, which glass comprises a plurality of regions R1 to R5 allocated to the following five light functions respectively: reversing lamp; flashing indicator lamp; rear fog lamp; tail lamp; and brake lamp. Naturally, appropriate light sources, together with reflectors or lenses, where appropriate, are provided in association with each of the regions.

The regions R1, R2, R3, and R5 are made in the manner shown in FIGS. 6 to 9, having strips Z1 constituted by non-catadioptric elements 20 of the invention alternating with strips Z2 made up of light diffusion elements 50.

The region R4 corresponding to the tail lamp comprises strips Z3 made up of genuine catadioptric elements 10 alternating with strips Z2 made up of light diffusion elements 50.

The zones Z2 in the three regions R3 to R5 are preferably all of the same width (which may also apply to the zones Z2 in the regions R1 and R2), whereas the zones Z1 and Z3 are likewise all of the same width. This makes the appearance of the glass G highly uniform, particularly at the bottom thereof, where the genuine catadioptric zones Z3 have practically the same appearance as the non-catadioptric zones Z1 when the lights are out.

As mentioned above, making a mold portion for mass producing a glass of the invention requires blind holes having conical ends to be formed for the non-catadioptric elements. Under such circumstances, in order to obtain a transition that is as sharp and as regular as possible between the non-catadioptric zones Z1 and the adjacent zones Z2, a groove of rectangular bottom section is initially formed in the mold, and the conical bottoms are subsequently formed therein. In addition, the presence of such grooves makes it possible to avoid direct intersections between the cones of the non-catadioptric elements and the adjacent toroidal elements, which could give rise to parts that are impossible to unmold where the glass slopes significantly. In particular, FIG. 8 shows straight lines D constituting transitions between the zones Z1 and Z2, i.e. corresponding to the edges of the groove, and FIG. 9 shows rectangular section ribs N that correspond to the grooves in the mold.

The present invention is naturally not limited in any way to the embodiment described above and shown in the drawings, and the person skilled in the art will be able to provide any variation or modification thereof coming within the ambit of the invention.

In particular, a single glass of the invention may include non-catadioptric elements of different designs with respect to the angles at the apex of their cones and the orientations of said cones. The same applies to certain non-catadioptric elements that pass light and may coexist with other non-catadioptric elements that do not pass light.

I claim:

1. A glass for at least one signalling lamp of a motor vehicle, wherein the glass comprises in at least a first zone a plurality of catadioptric elements each having on the inside face of the glass an end made of three mutually perpendicular planar surfaces, and in at least a second zone adjacent to said first zone a plurality of non-catadioptric elements each having on the inside face of the glass a conical end having an angle at the apex substantially different from 90°, whereby said catadioptric elements and non-catadioptric elements have similar visual aspects from the outside of the glass and provide a visual homogeneity to said glass, while the area of the glass having a catadioptric function is limited to said first zones.

2. A glass according to claim 1, wherein the angle at the apex of at least part of the non-catadioptric elements lies in the range of about 110° to about 165°, thereby allowing light that is incident on said inside face of the glass to pass through.

3. A glass according to claim 2, therein the angle at the apex of at least part of the non-catadioptric elements lies in the range of about 130° to about 150°, thereby allowing light that is incident on said inside face of the glass to pass through.

4. A glass according to claim 1, wherein the angle at the apex of at least part of non-catadioptric elements is less than about 110°, thereby obscuring at least a portion of the light incident on said inside face of the glass.

5. A glass according to claim 1, wherein at least one of the angles at the apex and the orientation of the axes of the conical ends vary from one non-catadioptric element to another.

6. A glass according to claim 1, wherein at least one group of non-catadioptric elements is disposed in an elongate strip including one or more rows of said elements.

7. A glass according to claim 6, comprising a plurality of non-catadioptric elongate parallel strips each including one or more rows of non-catadioptric elements, alternating with a plurality of elongate strips for treating a light beam incident on the inside face of the glass.

8. A glass according to claim 7, wherein each of said elongate strips for treating a light beam includes a plurality of light diffusion elements.

9. A glass according to claim 8, wherein the pitch of said light diffusion elements in the direction of the elongate strips is identical to the pitch of the non-catadioptric elements of said strips, or to an integer multiple thereof.

10. A glass according to claim 6, wherein each conical end of a non-catadioptric element, is provided on a fib that extends over the inside face of the glass for at least a fraction of the width of each non-catadioptric strip.

11. A glass according to claim 1, wherein said first zones are comprised of first elongated parallel strips spaced from each other and said second zones are comprised of second elongated parallel strips spaced from each other and in line with said first elongated parallel strips.

12. A glass according to claim 11, wherein said first and second zones are provided in first and second regions of the glass so as to correspond to two different light functions of a signalling lamp block.

13. A motor vehicle signalling device including at least one signalling function, including a glass according to claim 1.

* * * * *

UNITED STATES PATENT AND TRADEMARK OFFICE
CERTIFICATE OF CORRECTION

PATENT NO. : 5,436,762

DATED : July 25, 1995

INVENTOR(S) : Duneau

It is certified that error appears in the above-identified patent and that said Letters Patent is hereby corrected as shown below:

Title page, item [75] Inventor :

Delete "Andreé" and substitute--André--.

Signed and Sealed this

Thirty-first Day of October 1995

Attest:

Bruce Lehman

BRUCE LEHMAN

*Attesting Officer* *Commissioner of Patents and Trademarks*